United States Patent [19]

Nagano

[11] Patent Number: 4,742,728
[45] Date of Patent: May 10, 1988

[54] OPERATING LEVER FOR A BICYCLE DERAILLEUR

[75] Inventor: Masashi Nagano, Osaka, Japan
[73] Assignee: Shimano Industrial Company Limited, Osaka, Japan
[21] Appl. No.: 838,121
[22] Filed: Mar. 10, 1986
[30] Foreign Application Priority Data Mar. 8, 1985 [JP] Japan .................. 60-46932

[51] Int. Cl.⁴ .......................... G05G 11/00
[52] U.S. Cl. .................. 74/488; 74/489; 74/501 B; 74/531
[58] Field of Search .......... 74/527, 502.2, 500.5, 74/475, 488, 501.5 R, 531, 489; 411/291

[56] References Cited

U.S. PATENT DOCUMENTS 2,168,469 8/1939 Brouwer .................. 411/291 X
4,267,742 5/1981 Cabeza .

FOREIGN PATENT DOCUMENTS 0053776 6/1982 European Pat. Off. .
3405421 8/1984 Fed. Rep. of Germany .
2280540 2/1976 France .
2285290 4/1976 France .
2540819 8/1984 France .
422400 6/1947 Italy ............................ 74/489
716570 10/1966 Italy ............................ 74/489
54-31143 10/1979 Japan ....................... 74/501.5 R
57-20477 1/1982 Japan .
59-127127 7/1984 Japan ......................... 74/502.2
16001 of 1900 United Kingdom ............ 74/489
23801 of 1905 United Kingdom ............ 74/489
664785 1/1952 United Kingdom .

Primary Examiner—Gary L. Smith
Assistant Examiner—Rodney M. Lindsey
Attorney, Agent, or Firm—Stevens, Davis, Miller & Mosher

[57] ABSTRACT

An operating lever for a bicycle is provided with a support means having a lever shaft and supporting a lever body to a fixing member. A resistance applying means is separate from the support means and is tightened radially with respect to the lever shaft to apply resistance to rotation thereof, so that the rotational resistance is not varied when in use, and is capable of fine adjustment.

2 Claims, 2 Drawing Sheets

OPERATING LEVER FOR A BICYCLE DERAILLEUR

FIELD OF THE INVENTION

The present invention relates to an operating lever for a bicycle used to mainly operate a derailleur for the bicycle.

BACKGROUND OF THE INVENTION

Generally, this kind of operating lever, as disclosed in Japanese Utility Model Publication No. Sho 57-20, 477, is provided with a fixing member fixed to the bicycle frame and having a cylindrical lever shaft, a lever body provided with a boss which has a wire-winding groove for winding therein a control wire connecting with a derailleur and is supported rotatably to the lever shaft, a mounting screw screwable with a threaded bore provided at the center of the lever shaft, and a spring washer interposed between the boss of the lever body and the head of the mounting screw, the boss being fitted rotatably onto the lever shaft, the spring washer abutting against one side surface of the boss, and the mounting screw tightly screwing with the threaded bore at the lever shaft, thereby bringing the spring washer into pressure-contact with the one side surface of the boss to apply to rotation of the lever body a resistance overcoming a return spring at the derailleur and maintaining the position of the operated lever body.

In such a conventional operating lever, the mounting screw thus tightened to apply the rotational resistance to the lever body cannot be tightened until locked.

As a result, repetition of the lever operation loosens the mounting screw, thereby creating the situation that the lever body cannot be maintained in the operated position.

Also, the boss is subjected only at a side surface of limited surface area to react with the rotational resistance through the spring washer, whereby a sufficient surface area for generating the resistance is not ensured, resulting in large variations in resistance during screwing of the mounting screw, thereby creating the problem of making it difficult to obtain a fine adjustment of the rotational resistance to the lever body.

SUMMARY OF THE INVENTION

In order to solve the above problems, the present invention has been designed. An object of the invention is to provide an operating lever which is provided with a resistance applying means separate from a support means for supporting the resistance of the lever body to the fixing member, thereby enabling the lever body to be adjustable independent of the support means, and which applies a rotational resistance to the lever body through its inner surface which is rotatable with respect to the fixing member, thereby ensuring a sufficiently large surface area for generating the resistance.

The present invention is characterized by providing a fixing member, a lever body, a support means including a lever shaft for supporting the lever body rotatably to the fixing member, and a resistance applying means screwably tightened with respect to the lever shaft radially inwardly thereof.

The operating lever of the invention is provided with the resistance applying means separate from the support means so as to eliminate the problem of loosening the mounting screw which causes variation in the rotational resistance in the prior art device which screws the mounting screw with the lever shaft, thereby rotatably mounting the lever body thereto and simultaneously applying the rotational resistance thereto. Hence, the lever body can reliably maintain its operated position.

Moreover, the rotary inner periphery of the lever body with respect to the fixing member is used to apply the rotational resistance to the lever body. Hence, even a small lever body ensures a sufficiently wide area for generating the resistance, thereby reducing variations in resistance against operation of the resistance applying means to that extent, thus enabling fine adjustment of the rotational resistance to the lever body.

The lever shaft in the support means is mainly separate from the lever body and fixing member and fitted into a bore formed at the fixing member. Alternatively, the lever shaft may be integral with the lever body or the fixing member.

In a case where the lever shaft is separate from the fixing member, the fitting bore formed at the fixing member communicates with the exterior through a slot in continuation of the bore and the resistance applying means comprises an adjusting screw for reducing the fitting bore in diameter. In a case where the lever shaft is fixed to the fixing member, the lever body is provided with a fitting bore communicating with the exterior through a slot in continuation of the bore, the resistance applying means comprising the adjusting screw for reducing the fitting bore diameter.

The above and further objects and novel features of the invention will be more fully apparent from the following detailed description when read in connection with the accompanying drawings.

BRIEF DESCRIPTION OF THE INVENTION

FIG. 1 is a partially cutaway front view of an embodiment of an operating lever of the invention, FIG. 2 is a sectional view taken on the line II—II in FIG. 1, and FIG. 3 is a sectional view taken on the line III—III in FIG. 1.

DETAILED DESCRIPTION OF THE INVENTION

Figure 1:
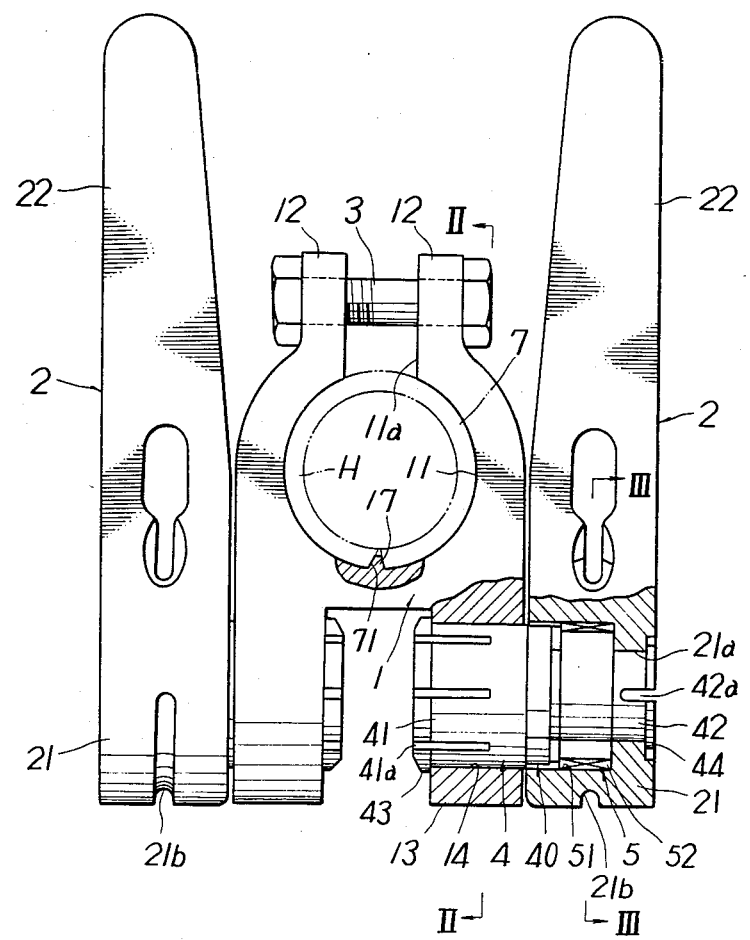

Referring to FIG. 1, a pair of lever bodies 2 are supported rotatably to a fixing member 1 fixed to a handle stem H at the bicycle and connected through control wires to a front derailleur and a rear derailleur having return springs and chain guides respectively, so that each lever body is operated forwardly to pull the wire against the return spring, whereby a driving chain guided by each chain guide is shifted to a desired sprocket at a multistage sprocket assembly. Each lever body 2 is operated backwardly to return the wire by the return spring to thereby shift the chain. The lever bodies 2, which are fundamentally the same in construction, will be described regarding the right-hand lever body only for the convenience of explanation.

The fixing member 1 is provided with a clamping portion 11 having a slot 11a to clamp a handle stem H to the bicycle and a pair of lugs 12 extending outwardly, so that a screw bolt 3 screws with the lugs 12 to reduce the clamping portion 11 in diameter.

The lever body 2 comprises a boss 21 having at its center a through bore 21a and at its outer periphery a wire winding groove 21b, and an operating portion 22 extending outwardly from one side of the boss 21.

Figure 2:
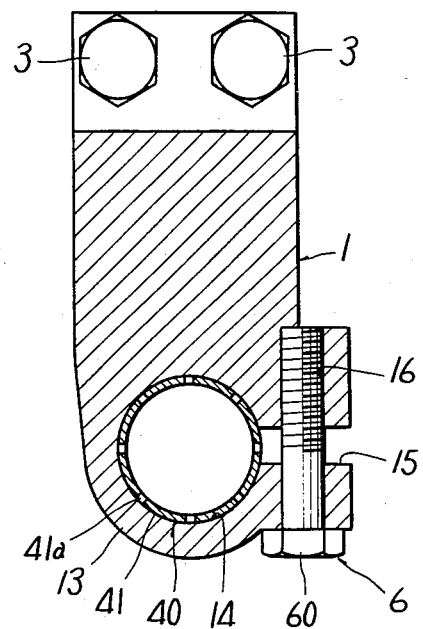

In the embodiment shown in FIG. 1, a mounting leg 13 projects from the fixing member 1 and has a fitting bore 14 and a slot 15 open at the bore 14 as shown in FIG. 2. A support member 40 having a lever shaft 41 to constitute support means 4 is rotatably supported through bore 21a at the boss 21 and provided integrally with ratchet pawls 52 engageable with ratchet teeth 51, thereby forming a unidirectional rotary transmission 5 so that the support member 40 associates with the lever body 2 when rotating in one direction. The lever shaft 41 is fitted rotatably into the bore 14, the mounting leg 13 is provided with a threaded bore 16 intercrossing the slot 15, and an adjusting screw 60 is tightly screwed with the threaded bore 16 as shown in FIG. 2, to reduce the bore 14 in diameter, thereby radially tightly embracing the lever shaft 41 to apply the rotational resistance to the support member 40, and in turn, the lever body 2.

Also, the support member 40 has at one end the lever shaft 41, at the other end a coupling shaft 42, both shaft 41 and shaft being cylindrical in shape, and at an intermediate position the ratchet pawls 52, the lever shaft 41 and coupling shaft 42 having at their distal ends, flanges 43 and 44, respectively, projecting radially outwardly. The lever shaft 41 is fitted into the bore 14, and the coupling shaft 42 is fitted into the through bore 21a to thereby mount the support member 40 on the fixing member 1 and lever body 2. Hence, the engaging flange 43 engages with one end of the fitting bore 14 and engaging flange 44 with one end of the through bore 21a. As a result, the support member 40 is not axially movable but rotatable only. The lever shaft 41 and coupling shaft 42 are provided with slits 41a and 42a each extending from the end of the shaft 41 or 42, including the flange 43 or 44, axially inwardly in a predetermined length, and when fitted into the fitting bore 14 and through bore 21a, are reduced in diameter through the slits 41a and 42a.

Figure 3:
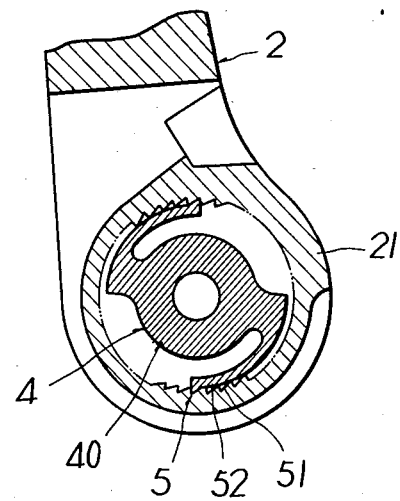

Referring now to FIG. 3, the ratchet pawls 52 are formed of flexible plate-like members projecting outwardly from the outer periphery of the support member 40 and extend circumferentially thereof and engage at the utmost ends with the ratchet teeth 51.

In addition, the operating lever in FIG. 1 is provided at the inner surface of the clamping portion 11 at the fixing member 1 with a locking projection 17 integral therewith, so that when the fixing member 1 is fitted onto the handle stem 7, the locking projection 17 engages with a groove 71 which is V-shaped in section at the abutting ends of the cylindrical handle stem H, thereby locking the fixing member 1 thereto.

Alternatively, a set screw (not shown) may screwably extend through the clamping portion 11 to engage with the groove 71.

The operating lever constructed as above-mentioned is mounted on the handle stem H in such a manner that the clamping portion 11 at the fixing member 1 is fitted onto the handle stem H and the fixing screw bolt 3 is tightened to reduce the clamping portion 11 in diameter, thereby screwing the fixing member 1 to the handle stem H. The lever body 2 is mounted on the fixing member 1 in such a manner that the coupling shaft 42 at the support member 40 is fitted into the through bore 21a, thereby being coupled with the lever body 2 not axially movably but rotatably only, at which time the ratchet pawls 52 engage with the ratchet teeth 51 respectively. Next, the lever shaft 41 is fitted into the bore 14 at the fixing member 1 such that it is not axially movable but rotatable only.

The adjusting screw bolt 60 is screwably controlled to radially tighten the lever shaft 41, thereby applying the resistance overcoming the return spring at the derailleur to the rotation of the support member 40, in turn the lever body 2.

In this case, the entire peripheral surface of bore 14 can be used to apply a frictional resistance to the lever shaft 41, thereby ensuring a sufficiently wide area for generating the frictional resistance without making the lever body 2 larger in the size. Hence, a fine adjustment on the rotational resistance to the lever body 2 is possible.

Moreover, the adjusting screw 60, perpendicular to the axis of rotation of the lever body 2, gives the rotational resistance thereto, whereby the lever body 2, even when repeatedly rotatably operated, can avoid variation in the rotational resistance.

Also, the lever body 2 coupled with the support member 40 is urged from one side toward the fixing member 1, thereby being mounted thereon at a single stroke.

The lever body 2, when forwardly operated against the return spring, freely rotates not only through the unidirectional rotary transmission 5 but also with respect to the support member 40. The lever body 2, when backwardly operated, engages and rotates integrally with the support member 40 through the same arc. Hence, the lever body 2 is forwardly and backwardly operable by a uniform operating force.

Alternatively, the support member 40 may be integral with the lever body 2. In this case, the unidirectional rotary transmission 5 is not required. Also, the support member 40, when separate from the lever body 2, may be fixed thereto through, for example, a screw bolt screwable with a threaded bore formed at the center of the coupling shaft 42.

Alternatively, the lever shaft 41 may be mounted on the fixing member 1. In this case, a fitting bore having a slot is formed at the lever body 2 and an adjusting screw is mounted on a slot-forming portion of the boss 21 at the lever body 2.

FIG. 2 illustrates the resistance applying means 6 using the adjusting screw 60 is not particularly defined or limited with respect to its structure. The support means 4 also is not particularly defined or limited with respect to its structure.

While a preferred embodiment of the invention has been described using specific terms, such description is for illustrative purpose only, and it is to be understood that changes and variations may be made without departing from the spirit or scope of the following claims.

What is claimed is:

1. An operating lever for a bicycle derailleur, said derailleur including a return spring, said operating lever comprising a fixing member, a lever body, a support means including a lever shaft for supporting said lever body rotatably with respect to said fixing member and a resistance applying means for tightening said fixing member with respect to said lever shaft in a radially inward direction thereof so as to apply a resistance to rotation of said lever body, said resistance having a magnitude sufficient to overcome a spring force of said return spring, said fixing member including a bore for said lever shaft and a slot in continuation of said bore so as to allow said bore to be adjustable in size, said resistance applying means comprising an adjusting screw for reducing said bore in its diameter, said lever shaft being provided on a support member separate from said lever body, and a unidirectional rotary transmission being provided between said support member and said lever body, said unidirectional rotary transmission rotating together with said support member only when said lever body rotates in one direction and freely rotating with respect to said support member when said lever body rotates in the other direction.

2. An operating lever for a bicycle according to claim 1, wherein said lever shaft is provided at one end thereof with a flange, said flange being engageable with the end face of said fixing member peripherally surrounding said bore and each of said flange and said lever shaft having slits extending from said one end of said lever shaft.

* * * * *